June 26, 1956  L. C. MILLER  2,751,922
PORTABLE POWER DRIVEN RECIPROCATING TOOL
Filed Aug. 4, 1952  4 Sheets-Sheet 1
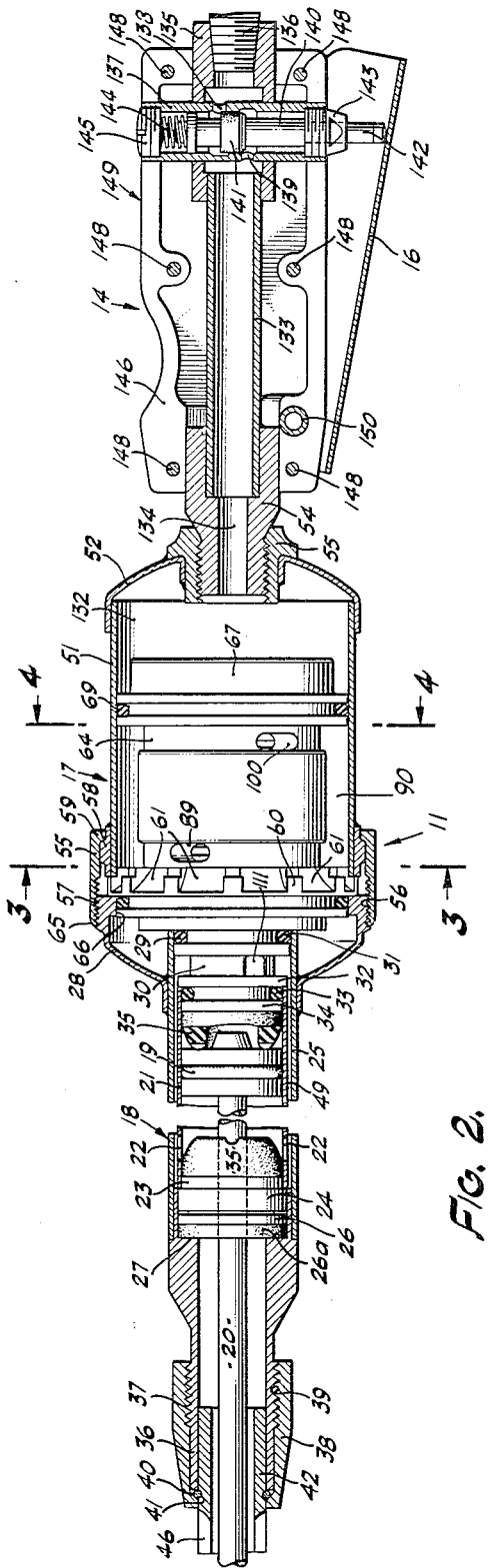
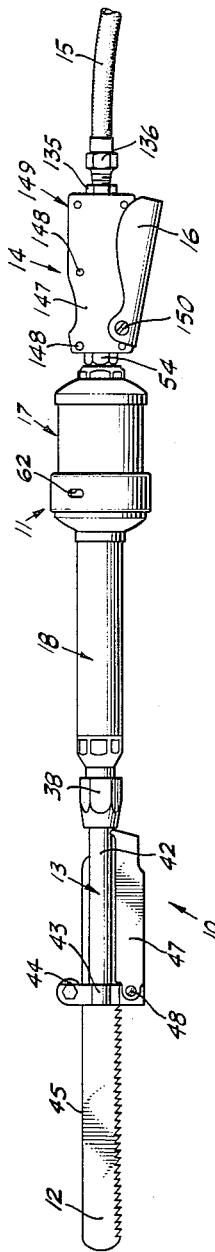
LEONIDAS C. MILLER
INVENTOR.
BY Lyon & Lyon
ATTORNEYS June 26, 1956        L. C. MILLER        2,751,922

PORTABLE POWER DRIVEN RECIPROCATING TOOL

Filed Aug. 4, 1952        4 Sheets-Sheet 2

LEONIDAS C. MILLER
INVENTOR.

BY

ATTORNEYS

June 26, 1956  L. C. MILLER  2,751,922
PORTABLE POWER DRIVEN RECIPROCATING TOOL
Filed Aug. 4, 1952  4 Sheets-Sheet 3
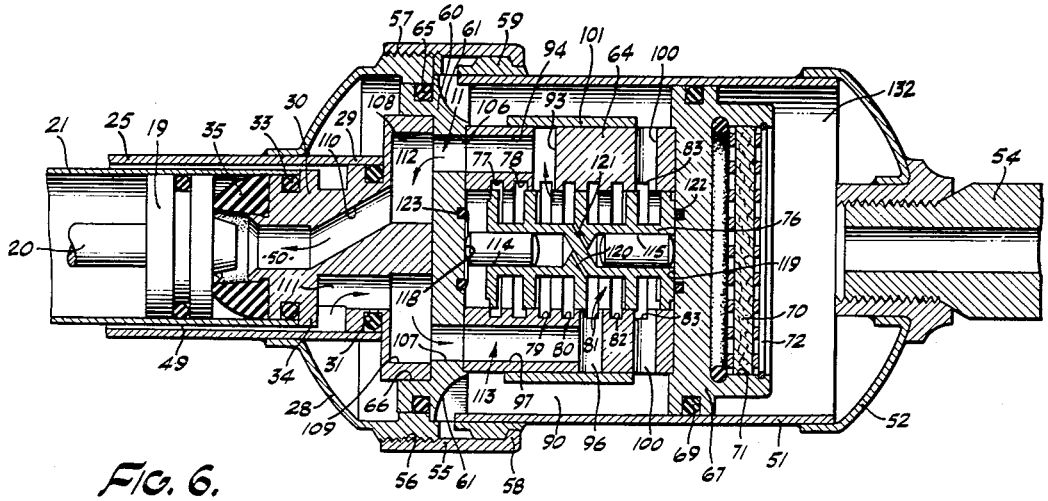
FIG. 6.
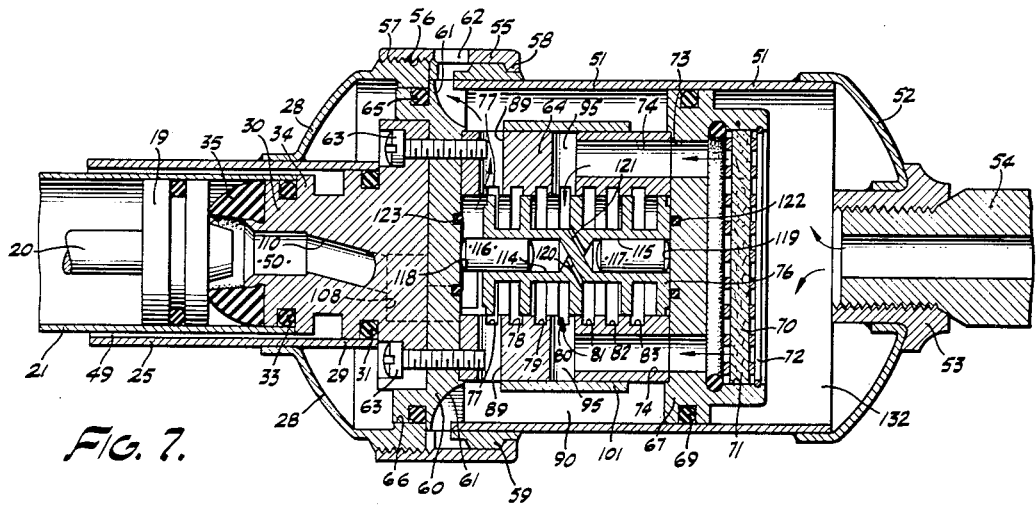
FIG. 7.
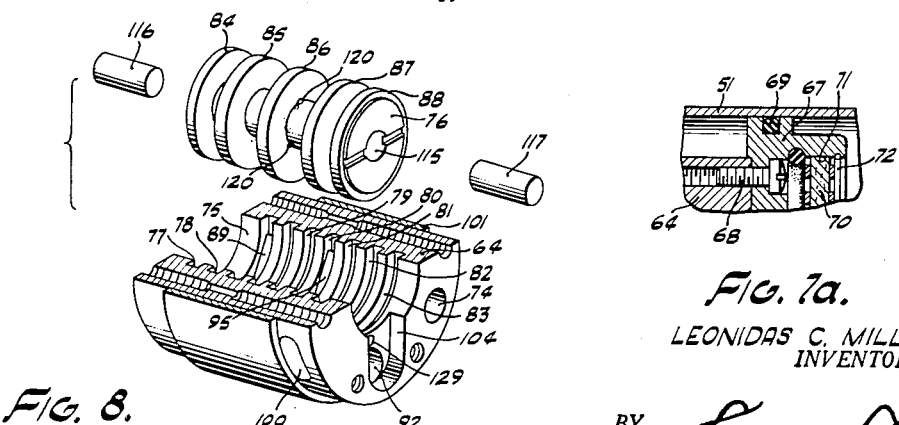
FIG. 8.
FIG. 7a.
LEONIDAS C. MILLER
INVENTOR.
BY *Lyon+Lyon*
ATTORNEYS

LEONIDAS C. MILLER
INVENTOR.

BY Lyon+Lyon
ATTORNEYS

United States Patent Office 2,751,922
Patented June 26, 1956

2,751,922
PORTABLE POWER DRIVEN RECIPROCATING TOOL

Leonidas C. Miller, Los Angeles, Calif.

Application August 4, 1952, Serial No. 302,477

9 Claims. (Cl. 137—106)

This invention relates to power operated tools and is particularly directed to improvements in pneumatically operated reciprocating actuator devices. This invention will be described in connection with an air powered pruning and trimming saw, but it is to be understood that this is by way of illustration only and does not constitute any limitation on the use of my invention.

An important object of this invention is to provide a shuttle valve assembly of novel design for alternately pressurizing and venting a pair of outlet conduits. Another object is to provide such a device in which the outlet conduits of the shuttle valve assembly are connected to opposed ends of a power cylinder for reciprocating a piston therein.

In conventional valve-controlled reciprocating devices, a valve part is required to pass ports, or is tripped mechanically, in order to effect reverse flow of pressure fluid. Such devices require that substantially a full stroke in each direction occur before reversal of motion can be effected. If motion of the tool is arrested, by overloading or otherwise, before it reaches the end of its stroke, it does not reverse, and consequently the device stalls. Accordingly it is another object of my invention to provide a shuttle valve assembly having a reciprocating element for reversing flow of fluid pressure through outlet conduits, the reciprocating element and enclosing parts being of novel design to cause shifting of the element in response to pressure changes in the outlet conduits. Such a device permits "short-stroking" so that if the reciprocating tool is overloaded, it will continue to operate with a shorter stroke.

Other and more detailed objects and advantages will appear hereinafter.

In the drawings:

Figure 1 is a side elevational showing a preferred embodiment of my invention.

Figure 2 is a longitudinal sectional view.

Figure 6 is a view similar to Figure 5 taken substantially on the lines 6—6 as shown in Figure 3.

Figure 7 is a sectional view similar to Figures 5 and 6 taken substantially on the lines 7—7 as shown in Figure 4.

Figure 7a is a sectional detail showing the connection of the filter support ring to the shuttle valve body.

Figure 8 is a perspective view, partly broken away, showing details of the shuttle valve assembly.

Figure 3:
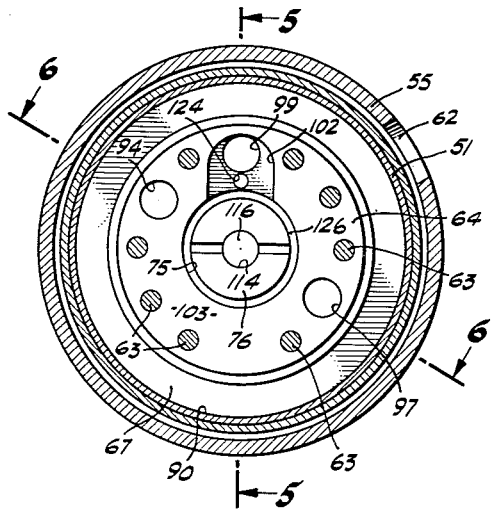
Figure 3 is a transverse section taken substantially on the lines 3—3 as shown in Figure 2.
Figure 4:
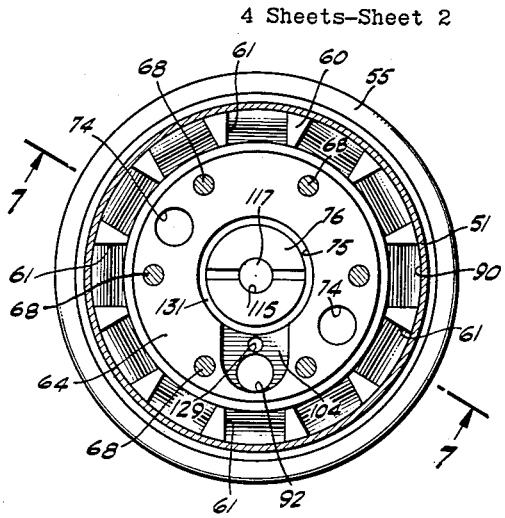
Figure 4 is a transverse sectional view taken substantially on the lines 4—4 as shown in Figure 2.

Referring to the drawings, the portable pruning and trimming saw assembly generally designated 10 includes a pneumatic actuator assembly 11, a reciprocating saw blade 12, a detachable supporting and connecting assembly 13 and a fluid pressure control valve 14. In the general plan of operation, air pressure is supplied through hose 15 to the valve 14. When the valve lever 16 is depressed, air is admitted to the pneumatic actuator assembly 11 which causes the saw blade 12 to reciprocate.

The pneumatic actuator assembly 11 includes a shuttle valve assembly 17 and a power cylinder assembly 18. The power cylinder assembly 18 includes a piston 19 fixed on piston rod 20 and received in sealing engagement with the inner surface of the cylinder 21. The cylinder 21 is provided with a series of lateral ports 22 near its forward end. The cylinder 21 is centered at its forward end by means of the cylindrical portion 23 of the bushing ring 24 which is in turn confined within the housing shell 25. Spacer ring 26 and rubber seal ring 26a are interposed between the bushing ring 24 and the annular shoulder 27 on the housing 25. A flange ring 28 supports the rear end of the housing with respect to the shuttle valve assembly 17 and the housing extends within this flange as shown at 29. A projecting part 30 on the forward end of the shuttle valve assembly 17 is provided with a seal ring 31 which engages the inner cylindrical surface of the housing 25 to form a seal. This projection 30 also carries a ring 32 which forms an axial stop for the rear end of the cylinder 21. A seal ring 33 carried on the projection 30 forms a seal with the inner surface of the cylinder 21 and a centering ring 34 engages the inner surface of the cylinder 21 to maintain it in a central position. Resilient bumper blocks 35 are mounted on the projection 30 and bushing ring 24 for engagement with the piston 19 at opposite ends of its stroke.

The forward end 36 of the housing 25 is reduced in diameter and provided with an external thread 37. A coupling collar 38 having internal threads 39 encircles the forward end 36 of the housing 25 and serves to maintain a split ring 40 in engagement with a groove 41 in the outer surface of the stationary connecting tube 42. The construction and operation of the parts forming this connection are described in my copending application Serial No. 273,058, filed February 23, 1952. A cross head 43 is fixed to the forward end of the stationary connecting tube 42, and this cross head carries a roller 44 which rides along the back edge 45 of the saw blade 12. The tube 42 is slotted axially for a major portion of its length, as shown at 46, to receive the reciprocating blade 12. A guard 47 is pivoted to the cross head at 48.

When fluid pressure is introduced into the cylinder 21 at the right-hand end thereof as viewed in the drawings, the piston 19 and rod 20 move to the left. The rod is connected to the saw blade by means of a threaded connection not shown. Fluid pressure is exhausted from the left-hand end of the cylinder 21 through the lateral ports 22 and into the annular space 49 between the cylinder 21 and the housing 25. Similarly when the annular space 49 is pressurized, the piston 19 moves to the right and fluid pressure is exhausted through the central passage 50 within the projection 30.

The shuttle valve assembly generally designated 17 includes a shell 51 having an integral end flange 52 at one end. A threaded bushing 53 is fixed centrally to the end flange 52 and receives the externally threaded projection 54 on the control valve 14. The shell 51 is connected to the housing flange 28 by means of the ported ring 55. The ring is internally threaded at 56 to engage the external threads 57 on the housing 28. The ring 55 is provided with an internal annular shoulder 48, 58 which engages the external shoulder 59 on the shell 51. The ring 55 serves to clamp the shell 51 and housing flange 28 together and also to clamp the radially projecting disk 60 between them. This disk is provided with a plurality of recesses 61 which communicate with the annular space within the ring 55 and with the radial ports 62 in the ring 55. The projection 30 is secured to one side of the disk 60 by means of the threaded elements 63. These threaded elements pass completely through the disk 60 and also serve to secure the shuttle valve body 64 to the other face of the disk. A seal ring 65 carried on the disk engages a cylindrical surface 66 provided within the housing flange 28.

The shuttle valve body 64 is positioned within the shell 51 and is connected at one end to the filter support ring 67 by means of the screws 68. A seal ring 69 carried on the filter support ring engages the inner cylindrical surface of the shell 51 to form a seal. Filter elements 70 are mounted within the annular recess 70 and held in place by means of a removable split ring 72. Inlet ports 73 in the ring 67 are aligned with inlet ports 74 in the shuttle valve body 64.

Figure 5:
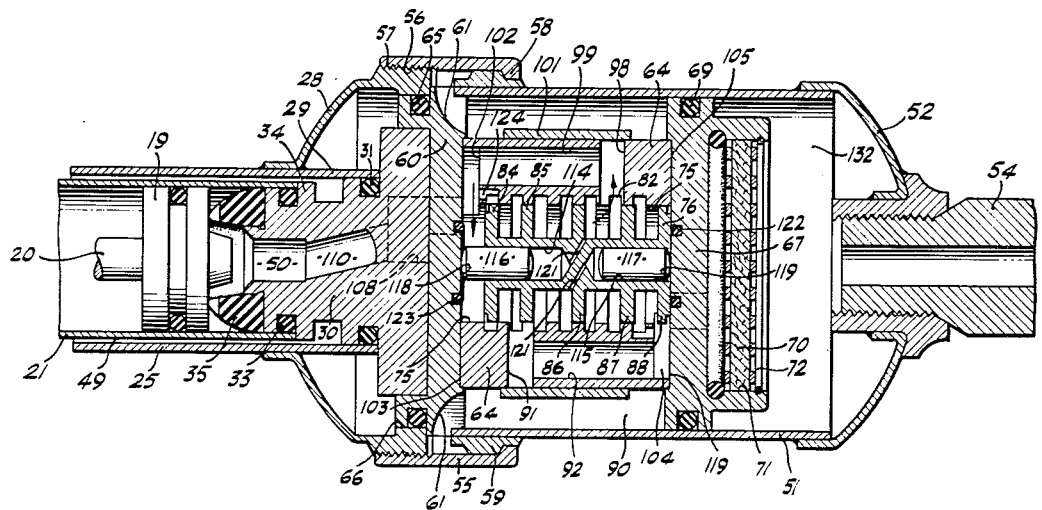
Figure 5 is a longitudinal sectional view taken substantially on the lines 5—5 as shown in Figure 3.

The shuttle valve body 64 is provided with a central cylindrical bore 75 closed at each end. This bore 75 slidably receives the shuttle valve spool 76. The bore 75 is interrupted by a plurality of axially spaced cylindrical grooves 77, 78, 79, 80, 81, 82 and 83. The spool 76 is provided with five concentric flanges of equal diameter 84, 85, 86, 87 and 88. Each of the cylinder grooves in the body 64 is connected to a separate port or passageway. Thus, as shown in Figures 5, 6 and 7, the groove 77 communicates with the radial exhaust ports 89, which lead to the annular space 90 between the shuttle valve body 64 and the shell 51. The space 90 is vented through recesses 61 in the disk 60 and through ports 62 in the ring 55. The groove 78 communicates with the radial port 91 in the body 64 and this port 91 in turn communicates with axial passage 92 in the body 64. The groove 79 communicates with the radial port 93 in the body 64 and this radial port in turn communicates with the axial passage 94 in the body 64. The groove 80 communicates with the radial ports 95 in the body 64 and these ports in turn communicate with the inlet passages 74. The groove 81 communicates with radial port 96 in the body 64 and this port in turn communicates with the axial passage 97. The groove 82 communicates with radial port 98 and this radial port in turn communicates with the axial passage 99. The groove 83 communicates with radial ports 100 which in turn communicate with the annular space 90. A metallic ring 101 is pressed on the outer surface of the body 64 and serves to close off the outer ends of each of the radial ports 93, 95, 96 and 98.

A recess 102 is formed in the front face 103 of the body 64, and this recess serves to connect the axial passageway 99 with the interior of the bore 75. The axial passages 94 and 97 are aligned with through-ports 106 and 107, respectively, in the disk 60 (see Figure 6). The through-ports 106 and 107 in turn communicate with recesses 108 and 109, respectively, provided in the projecting part 30. The recess 108 communicates with the inclined passage 110 which in turn connects with the passage 50 leading to the space within the right-hand end of the cylinder 21. The recess 109 communicates with the axial passage 111 which in turn connects with the annular space 49 between the housing 25 and the cylinder 21. The radial port 93, axial passage 94, through-port 106, recess 108, inclined passage 110 and passage 50 are hereinafter collectively referred to as conduit 112. Similarly, the radial port 96, axial passageway 97, through-port 107, recess 109 and axial passageway 111 are collectively referred to hereinafter as conduit 113. It will be understood from the foregoing description that fluid passing through the conduit 112 in the direction of the arrows shown in Figure 6 serves to move the piston 19 to the left and to expel fluid to the annulus 49 and conduit 113.

The shuttle valve spool 76 is provided with a pair of axially extending aligned bores 114 and 115 for reception of the slide pins 116 and 117, respectively. One end of the pin 116 remains in contact with the surface 118 of the disk 60, and one end of the slide pin 117 remains in contact with the surface 119 of the filter circuit ring 67. Each pin forms a sliding seal within its respective bore, and the shuttle valve spool 76 reciprocates relative to these pins. A series of ports 120 extend from the bore 114 to the annular space between the flanges 86 and 87 on the shuttle valve spool 76. Another series of ports 121 establish communication between the bore 115 and the space between the shuttle valve flanges 85 and 86. In order to cushion the stroke of the shuttle valve 64, rubber bumper rings 122 and 123 may be mounted in the filter circuit ring 67 and disk 60, respectively.

Figure 9:
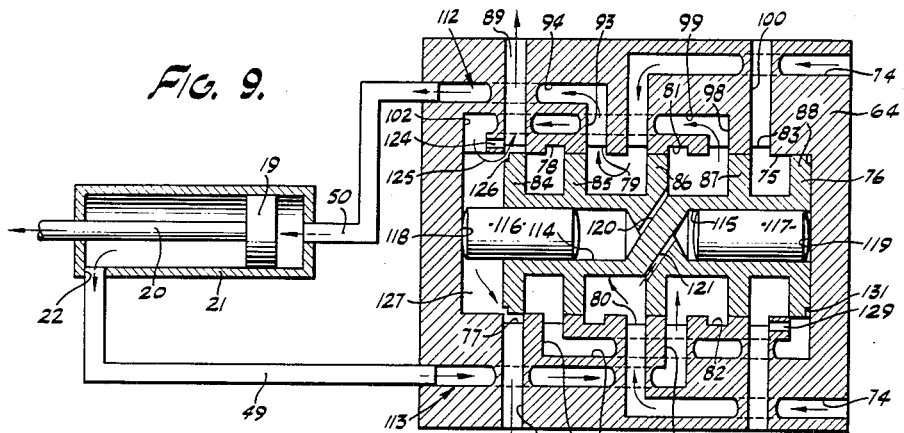
Figures 9, 10 and 11 are diagrammatic sectional views illustrating the action of the shuttle valve assembly in conjunction with the power cylinder.
Figure 10:
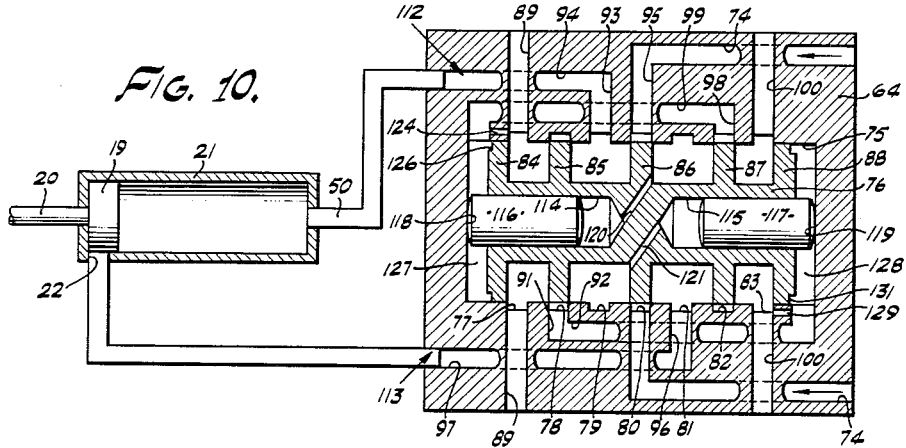
Figure 11:
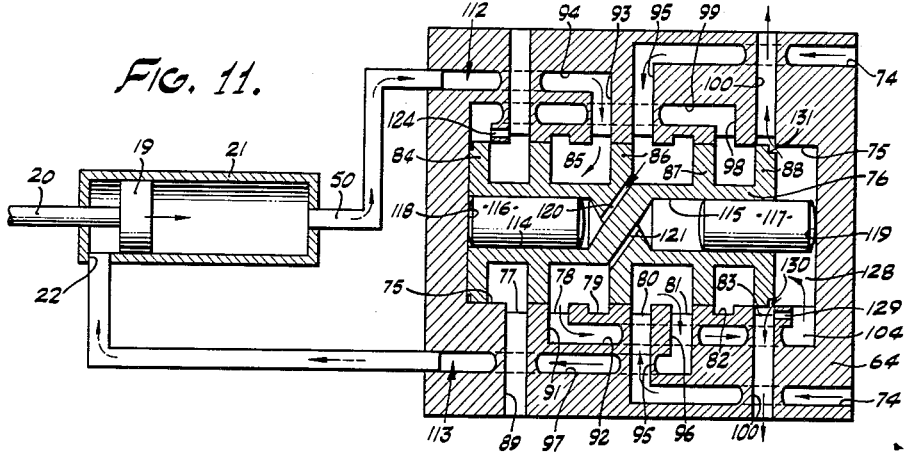

The operation of the shuttle valve assembly is best understood from a consideration of the diagrammatic illustrations shown in Figures 9, 10 and 11. With the shuttle valve spool 76 in the right-hand position as shown in Figure 9, fluid under pressure is admitted into inlet passages 74 and passes radially into the bore 75 through annular groove 80. The fluid under pressure then enters the space between the flanges 85 and 86 on the spool 76. It passes radially out through groove 79 and conduit 112 into the right-hand end of cylinder 21. The piston 19 and rod 20 move to the left, exhausting fluid pressure through conduit 49 and conduit 113. Fluid under pressure in conduit 113 passes inwardly through groove 81 into the space between the flanges 86 and 87 on the shuttle valve spool 76. The exhausting pressure fluid then passes out through groove 82 through passageway 99 and into recess 102 leading to the interior of the bore 75 at its forward end. An aperture or bypass port 124 leading from the recess 102 to the radial exhaust passages 89 provides a path for a part of the flow of exhausting pressure fluid. The remaining part passes in the manner shown by arrow 125 through a restricted annular space between the flange 84 and the groove 77. This restricted annular space is formed by the ring groove 126 cut in the outer edge of the flange 84. The pressure fluid exhausting through radial passages 89 is discharged from the system and vented to atmosphere. The pressure of the incoming fluid is reflected through ports 121 into the space 115. Similarly, the pressure of the exhausting fluid is reflected through ports 120 into the space 114. The shuttle valve spool 76 remains in the position shown in Figure 9 because the total axial forces tending to move it to the right are greater than the axial forces tending to move it to the left. Thus the endwise force exerted on the spool 76 by pressure of the exhausting fluid in spaces 127 and 120 is greater than the endwise pressure developed by the somewhat higher pressure of the incoming fluid reflected in the space 115. It will be understood that the endwise forces developed by pressures within the bore 75 between the various flanges balance out, without developing an axial resultant force on the shuttle valve.

The shuttle valve 76 remains in the position shown in Figure 7 so long as the piston 19 continues its motion to the left and thereby continues to cause flow of exhausting fluid through conduits 49 and 113. When the piston 19 reaches the end of its stroke, however, back pressure in the conduit 112 builds up and exhaust pressure in the conduit 113 falls off markedly. The pressure in the spaces 127 and 114 rapidly falls. The pressure in the space 115 increases. This change in pressure is sufficient to cause the endwise force on the spool 76 developed by the pressure in space 115 to overbalance the forces developed by the reduced pressures in spaces 127 and 114. The result is that the shuttle valve 76 shifts to the left.

Figure 10 shows the position of the parts when the shuttle valve has moved halfway from its right-hand position shown in Figure 9 to its left-hand position as shown in Figure 11. The shuttle valve spool 76 does not actually stop in the position shown in Figure 10, but on the contrary the spool 76 moves rapidly from one extreme position to the other. Figure 10 shows how the flanges on the shuttle valve spool 76 seal off the various annular grooves as the shuttle valve passes from one position to the other. The slide pins 116 and 117 do not move.

When the shuttle valve spool 76 reaches the left-hand position shown in Figure 11, fluid pressure admitted through inlet passageway 74 enters the bore 75 between the flanges 86 and 87 via the annular groove 80. The pressure fluid then passes out through groove 81 and through outlet conduit 113 and conduit 49 into the left end of the cylinder 21. This moves the piston 19 and rod 20 to the right and causes fluid to exhaust from the cylinder 21 through conduit 112. Exhausting fluid enters the bore 75 through annular groove 79 and enters the space between the flanges 85 and 86. It passes out through groove 78 and passageway 92 into the recess 104 communicating with the space 128 at the right-hand end of the bore 75. An aperture or bypass port 129 carries a part of the flow of pressure fluid from the recess 104 into the exhaust passages 100. The remaining part of the flow of pressure fluid passes into the space 128 and passes through the restricted annular passage 130 into the exhaust passages 100. The flange 88 is provided with a ring groove 131 on one end of its outer periphery to form the restricted passage 130.

The shuttle valve spool 76 remains in the position shown in Figure 11 until the piston 19 reaches the end of its return stroke. During the interval while the piston 19 is moving to the right, the endwise forces acting on the shuttle valve spool 76 are such as to maintain it in its left-hand position. Thus the pressure of the incoming fluid through passageway 74 is reflected through ports 120 into the space 114. This relatively high pressure within the small diameter chamber is not enough, however, to overcome the low pressure of the exhausting fluid in the larger space 128, supplemented by the same low pressure within the space 115 as reflected through ports 121. When the piston 19 reaches the end of its stroke, however, the pressure in the conduit 112 falls off markedly and the back pressure in the conduits 49 and 113 increases. The result is that the relatively high pressure within the small space 114 exerts a greater endwise force on the shuttle valve 75 than the reduced pressure in the spaces 128 and 115. The result is that the shuttle valve 76 shifts back to the position shown in Figure 9, and the cycle repeats again and again so long as the fluid pressure is supplied.

If the power operated tool 12 encounters considerable resistance, the length of stroke will shorten because the shuttle valve spool 76 shifts its position each time the piston 19 slows down materially in its stroke. The size of the bypass ports 124 and 129 also affects the speed of reciprocation of the tool 12. The smaller the ports the lower the speed of movement of the tool and the greater the thrust for each stroke.

It will be apparent that the sliding pins 16 and 17 remain at rest with respect to the body 64 while the shuttle valve spool 76 reciprocates with respect to them. Thus the pins 116 and 117 are functionally a part of the body 64. They are not attached to the body in order to avoid any problems of misalignment and in order ot simplify construction.

The function of the valve assembly 14 is to control admission of pressure fluid through the fitting 54 and into the chamber 132. Fluid pressure in this chamber 132 passes through the filter elements 70 and into the passages 74 via port 73. As shown in Figure 2, the valve assembly 14 includes a central pipe 133 communicating with the central passage 134 in the inlet fitting 54. The pipe 133 is fixed to the connection fitting 135. The air hose connection 136 engages the fitting 135. A transverse tube 137 is mounted on the fitting 135 and forms a barrier to the passage of pressure fluid through the fitting. The tube 137 has an inlet port 138 and an outlet port 139 extending radially through the wall of the tube. A movable valve member 140 is provided with a sealing cup 141 which engages the bore of the tube 137. This valve member is provided with a plunger 142 which extends slidably through a bushing 143 threaded to the tube 137. A spring 144 engages the valve member 140 at one end and engages a threaded plug 145 at the other end. The spring 144 acts to hold the valve member 140 in the closed position shown in Figure 2.

When the plunger 142 is depressed, the sealing cup 141 moves along the bore of the tube 137 and places the ports 138 and 139 in communication thereby allowing passage of fluid under pressure from the inlet fitting connection 136 to the pipe 133 and into the chamber 132. The spring 144 returns the valve to closed position when force on the plunger 142 is released. The bushing 143 and plug 145 can be interchanged end-for-end if desired so that the plunger 142 protrudes from the opposite end of the tube 137. A pair of cooperating halves 147 and 147 are clamped together about the fittings 54 and 135 by means of threaded elements 148 to define a handle 149. The operating lever 16 is pivoted to the handle 149 at 150.

Having fully described my invention, it is to be understood that I do not wish to be limited to the details herein set forth, but my invention is of the full scope of the appended claims.

I claim:

1. In a shuttle valve assembly, the combination of a body member having a bore, the body member having an inlet passage, an exhaust vent, and first and second conduits all communicating with the bore, a shuttle valve mounted to reciprocate axially within said bore, and acting alternately to connect each conduit to the vent and the passage, respectively, and then to the passage and the vent, respectively, the shuttle valve having axially aligned separate openings in the opposed ends thereof, separate independent stationary elements mounted within each of said openings and adapted to slidably engage said openings upon reciprocation of said shuttle valve, and ports in the shuttle valve extending from the inner ends of said openings and communicating with said bore at axially spaced locations.

2. In a shuttle valve assembly, the combination of a body member having a bore, the body member having an inlet passage, an exhaust vent, and first and second conduits, a shuttle valve mounted to reciprocate axially within said bore, spaced annular flanges on the shuttle valve, the body member having spaced annular grooves in said bore, the passage, vent and conduits each communicating with one of the grooves, respectively, the shuttle valve acting alternately to connect each conduit to the vent and the passage, respectively, and then to the passage and the vent, respectively, the shuttle valve having axially aligned separate openings in the opposed ends thereof, separate independent stationary elements mounted within each of said openings and adapted to slidably engage said openings upon reciprocation of said shuttle valve, and ports in the shuttle valve connecting the inner ends of said openings to opposite sides of one of said flanges.

3. In a four-way shuttle valve assembly, the combination of a body having first and second conduits, an inlet passage, and at least one exhaust passage, the body having a bore closed at both ends and provided with a series of axially spaced annular grooves in said bore, each of the passages and conduits communicating with one of the grooves, respectively, a shuttle valve mounted to reciprocate axially within said bore, the shuttle valve having a series of axially spaced annular flanges slidably received in said bore, the shuttle valve having axially aligned separate openings in the opposed ends thereof, separate independent stationary elements mounted within each of said openings and adapted to slidably engage said openings upon reciprocation of said shuttle valve, and ports in the shuttle valve connecting the inner ends of said openings to opposite sides of one of the flanges, the grooves and flanges cooperating in one position of the shuttle valve to connect each conduit to one of the passages and one of the ports, respectively, and cooperating in another position of the shuttle valve to connect each conduit to the other of the passages and the other of the ports, respectively.

4. In a four-way shuttle valve assembly, the combination of a body having an inlet passage, first and second exhaust passages, and first and second conduits, the body also having a bore closed at both ends, each of the passages and conduits communicating with the bore at axially spaced locations, the exhaust passages communicating with the bore near but spaced from the opposed ends thereof, a shuttle valve mounted to reciprocate axially within said bore and provided with axially aligned separate openings in the opposed ends thereof, separate independent stationary elements mounted within each of said openings and adapted to slidably engage said openings upon reciprocation of said shuttle valve, and first and second ports in the shuttle valve connecting the inner ends of said openings to the bore at axially spaced locations on the shuttle valve, the shuttle valve in one position engaging an end of the bore and connecting the first conduit and first port to the inlet passage and connecting the second conduit and second port to the second exhaust passage remote from said end of the bore, the shuttle valve in another position engaging the other end of the bore and connecting the second conduit and second port to the inlet passage and connecting the first conduit and first port to the first exhaust passage.

5. In a shuttle valve assembly, the combination of a body having an inlet passage, and first and second conduits, the body having a bore closed at both ends, each passage and conduit communicating with the bore at axially spaced locations, a shuttle valve mounted to reciprocate axially within said bore and provided with axially aligned separate openings in the opposed ends thereof, separate independent stationary elements mounted within each of said openings and adapted to slidably engage said openings upon reciprocation of said shuttle valve, and first and second ports in the shuttle valve connecting the inner ends of said openings to the bore at axially spaced locations on the shuttle valve, the shuttle valve in one position engaging an end of the bore and connecting the first conduit and first port to the inlet passage and connecting the second conduit and second port, the axial force developed by the inlet pressure communicated through the first port being less than the total axial forces developed by the pressure in the second conduit communicated to the other end of the bore and to the second port, whereby the shuttle valve is maintained in that position.

6. In a four-way shuttle valve assembly, the combination of a body having an inlet passage, first and second exhaust passages, and first and second conduits, the body also having a bore closed at both ends, each of the passages and conduits communicating with the bore at axially spaced locations, the exhaust passages communicating with the bore near but spaced from the opposed ends thereof, and apertures acting as bypass ports connecting each exhaust passage with the space at one extreme end of the bore, respectively, a shuttle valve mounted to reciprocate axially within said bore and provided with axially aligned separate openings in the opposed ends thereof, stationary elements mounted within each of said openings and adapted to slidably engage said openings upon reciprocation of said shuttle valve, and first and second ports in the shuttle valve connecting the inner ends of said openings to the bore at axially spaced locations on the shuttle valve, the shuttle valve in one position connecting the first conduit and first port to the inlet passage and connecting the second conduit and second port to the second exhaust passage, the shuttle valve in another position connecting the second conduit and second port to the inlet passage and connecting the first conduit and first port to the first exhaust passage.

7. In a four-way shuttle valve assembly, the combination of: a body member having a bore, a shuttle valve mounted to reciprocate axially within the bore, the body member having an inlet passage, an exhaust vent passage, and a pair of conduits, the shuttle valve acting alternately to connect each conduit to one of the passages respectively, and then to the other of said passages, respectively, and differential pressure means operative to shift the shuttle valve upon increase in back pressure in the conduit connected to the inlet passage.

8. In a four-way shuttle valve assembly, the combination of: a body member having a bore, a shuttle valve mounted to reciprocate axially within the bore, the body member having an inlet passage, an exhaust vent passage, and a pair of conduits, cooperating means on the shuttle valve and bore connecting each conduit to one of the passages, respectively, in one position of the shuttle valve, said cooperating means connecting each conduit to the other of said passages, respectively, in another position of the shuttle valve, and differential pressure means on the body member and shuttle valve operative to shift the shuttle valve upon increase in back pressure in the conduit connected to the inlet passage.

9. In a shuttle valve assembly, the combination of: a body member having a bore; a shuttle valve mounted to reciprocate axially in the bore; means including passage means in the body member defining an inlet passage, an exhaust vent, and first and second conduits all communicating with said bore; cooperating means on the shuttle valve and bore for connecting one of the conduits to the inlet passage and the other conduit to the exhaust vent, in one position of the shuttle valve; said cooperating means connecting the first said conduit to the exhaust vent and the other conduit to the inlet passage in another position of the shuttle valve; and differential pressure means operative to shift the shuttle valve from one position to the other upon increase in back pressure in the conduit connected to the inlet passage.

References Cited in the file of this patent

UNITED STATES PATENTS

| | | |
|---|---|---|
| 932,421 | Albree | Aug. 24, 1909 |
| 1,077,911 | Hultquist | Nov. 4, 1913 |
| 1,484,679 | Slater | Feb. 26, 1924 |
| 1,934,927 | Hultquist | Nov. 14, 1933 |
| 2,090,583 | Morton | Aug. 17, 1937 |
| 2,298,457 | Berges | Oct. 13, 1942 |
| 2,302,232 | MacNeil | Nov. 17, 1942 |
| 2,532,679 | Slater | Dec. 5, 1950 |
| 2,621,676 | Loft | Dec. 16, 1952 |